United States Patent
Yu et al.

(10) Patent No.: US 8,284,794 B2
(45) Date of Patent: Oct. 9, 2012

(54) ETHERNET SYSTEM AND RELATED CLOCK SYNCHRONIZATION METHOD

(75) Inventors: Ting-Fa Yu, Yunlin County (TW); Liang-Wei Huang, Taipei (TW); Rong-Jen Chang, Taipei County (TW); Ming-Je Li, Yilan County (TW)

(73) Assignee: Realtek Semiconductor Corp., Hsinchu (TW)

( * ) Notice: Subject to any disclaimer, the term of this patent is extended or adjusted under 35 U.S.C. 154(b) by 427 days.

(21) Appl. No.: 12/629,897

(22) Filed: Dec. 3, 2009

(65) Prior Publication Data

US 2010/0169704 A1    Jul. 1, 2010

(30) Foreign Application Priority Data

Dec. 3, 2008 (TW) ................................ 97146929 A

(51) Int. Cl.
*H04J 15/00* (2006.01)
(52) U.S. Cl. .................................................. 370/464
(58) Field of Classification Search .............. 370/464, 370/465, 474, 498, 503–520
See application file for complete search history.

(56) References Cited

U.S. PATENT DOCUMENTS

| 7,890,788 B2* | 2/2011 | Yin et al. ................ 713/500 |
| 7,920,597 B2* | 4/2011 | Conway et al. ........... 370/503 |
| 8,000,602 B2* | 8/2011 | Haran et al. .............. 398/72 |
| 8,009,695 B2* | 8/2011 | Diab et al. ............... 370/469 |
| 2006/0291602 A1* | 12/2006 | Ran ........................ 375/355 |
| 2009/0282277 A1* | 11/2009 | Sedarat et al. ............ 713/320 |
| 2010/0046543 A1* | 2/2010 | Parnaby .................... 370/465 |
| 2010/0118894 A1* | 5/2010 | Aweya et al. ............. 370/503 |
| 2011/0202781 A1* | 8/2011 | Wang et al. ............... 713/323 |

* cited by examiner

*Primary Examiner* — Dmitry H Levitan
(74) *Attorney, Agent, or Firm* — Thomas, Kayden, Horstemeyer & Risley, LLP

(57) ABSTRACT

A master device for an Ethernet system is disclosed. The master device includes a receiver, a buffer, a phase lock loop unit, and a transmitter. The receiver is used for generating phase adjustment data according to transmission data sent by a slave device when the master device operates during a switch mode. The buffer is coupled to the receiver for accumulating the phase adjustment data and outputting a phase adjustment value. The phase lock loop unit is coupled to the buffer for adjusting the phase of an output clock according to the phase adjustment value to maintain a fixed phase difference between the recovery clock and the output clock. The transmitter is used for transmitting initialization data to the slave device according to the output clock.

16 Claims, 9 Drawing Sheets

ETHERNET SYSTEM AND RELATED CLOCK SYNCHRONIZATION METHOD

BACKGROUND OF THE INVENTION

1. Field of the Invention

The present invention relates to a master device and related clock synchronization method, and more particularly, to a master device in an Ethernet system and related synchronization method.

2. Description of the Prior Art

Even if no data transmission takes place in a Gigabit Ethernet system, a master device and a slave device must synchronize by sending idle sequences. Nevertheless, continuously sending idle sequences causes too much power consumption when no data is transmitted. Thus, the Institute of Electrical and Electronics Engineers (IEEE) regulates an Energy Efficient Ethernet (EEE) specification for power saving purposes. Under the EEE specification, both the master and slave device enter a sleep mode, only waking up occasionally to send the idle sequences for synchronization, when the master device does not have data for transmission.

Regarding an Ethernet system, the slave device executes a timing recovery according to signals received. For example, a transmitter of the master device uses a free running clock for data transmission. The slave device executes the timing recovery to generate a recovery clock identical to a free running clock of the master device after the receiver of the slave device receives the transmitted signals. The transmitter and the receiver of the slave device individually transmit and sample signals according to the recovery clock. When the receiver of the master device receives the signals, transmitted based on the recovery clock, from the slave device, the receiver performs synchronization and optimizes clock phase for sampling.

To save power, there are two kinds of mechanisms for the Gigabit Ethernet in the sleep mode, namely symmetric and asymmetric mechanisms. In the case of the symmetric mechanisms, the master and the slave device both enter the quiet mode when no data is transmitted. And, both of them wake up when either the master or the slave device has to transmit data. During awakening, the master device is in control of leaving the quiet mode. All the slave device needs to do is to make a wake-up request. When the data transmission is one-way transmission and the master/slave is transmitting data, but the other one is not, the master and the slave device must wake up and enter the sleep mode together. The master device or the slave device is allowed to enter the quiet mode independently, thus causing extra power consumption.

The asymmetric mechanism includes the following two situations: First, the master device continuously sends data to the slave device when the slave device is operated in the quiet mode. Since the slave device receives the data from the master device and performs the timing recovery, the synchronization between the master and the slave device can still be achieved. Second, the slave device continuously sends data to the master device when the master device is operated in the quiet mode. In this situation, the slave device cannot execute the timing recovery due to no data being received from the master device. As time passes by, clock drift occurs, since the slave device has not received the free running clock from the transmitter of the master device, thereby causing the timing recovery not to be performed. When the master device wakes up for the first transmission, the transmitter of the master device cannot know how many phases the slave device's clock, received by the receiver of the master device, has drifted during this period. Therefore, the master device cannot accordingly adjust its clock for transmission to correspond to the phase drift of the data received.

To put it simply, the master device cannot synchronize with the slave device after waking up from a long sleep in the quiet mode. This causes a data reception error for the slave device.

SUMMARY OF THE INVENTION

It is therefore an objective of the present invention to provide a master device for an Ethernet system and related clock synchronization method, so as to avoid failures of the data reception.

The present invention discloses a master device for an Ethernet system. The master device includes a receiver, a buffer, a phase lock loop unit, and a transmitter. The receiver is used for generating phase adjustment data according to transmission data sent by a slave device when the master device operates during a switch mode. The transmission data includes phase information of a recovery clock of the slave device. The buffer is coupled to the receiver for accumulating the phase adjustment data and outputting a phase adjustment value. The phase lock loop unit is coupled to the buffer for adjusting the phase of an output clock according to the phase adjustment value to maintain a fixed phase difference between the recovery clock and the output clock. The transmitter is used for transmitting initialization data to the slave device according to the output clock.

The present invention further discloses a synchronization method for a master device in an Ethernet system. The synchronization method includes generating phase adjustment data according to transmission data sent by a slave device when the master device operates during a switch mode, accumulating the phase adjustment data and outputting a phase adjustment value, adjusting the phase of an output clock according to the phase adjustment value to maintain a fixed phase difference between the recovery clock and the output clock and transmitting initialization data to the slave device according to the output clock. Besides, the transmission data includes phase information of a recovery clock of the slave device.

The present invention further discloses a master device for an Ethernet system, for synchronizing with a slave device. The master device includes a receiver, a transmitter, a detection unit and a synchronization unit. The receiver is used for receiving transmission data from a slave device. The transmission data includes phase information of a recovery clock. The transmitter operates according to a first clock. The detection unit is coupled to the receiver and the transmitter, and used for detecting a phase difference between clocks of the master device and the slave device according to the first clock and the recovery clock. The synchronization unit is coupled to the detection unit, and used for comparing the phase difference with a tolerance value and controlling the master device to execute a process for synchronization with the slave device when the phase difference exceeds the tolerance value.

The present invention further discloses a method for performing synchronization between a master device and a slave device in an Ethernet system. The method includes receiving transmission data from the slave device, detecting a phase difference between clocks of the master device and the slave device according to the first clock and the recovery clock and comparing the phase difference with a tolerance value, and controlling the master device to execute a process for synchronization with the slave device when the phase difference exceeds the tolerance value. Besides, the transmission data includes phase information of a recovery clock of the slave device.

The present invention further discloses a slave device for reducing synchronization power consumption for an Ethernet system comprising a master device. The slave device includes a receiver, a transmitter, an operation unit, and a clock adjustment unit. The receiver is used for receiving an idle sequence from the master device. The transmitter is used for transmitting data to the master device according to an output clock. The operation unit is coupled to the receiver for generating a phase difference according to the idle sequence. The clock adjustment unit is coupled to the operation unit for adjusting the output clock according to the phase difference.

The present invention further discloses a method of reducing synchronization power consumption for a slave device in an Ethernet system comprising a master device. The method includes receiving an idle sequence from the master device, generating a phase difference according to the idle sequence, adjusting an output clock according to the phase difference and transmitting data to the master device according to the output clock.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
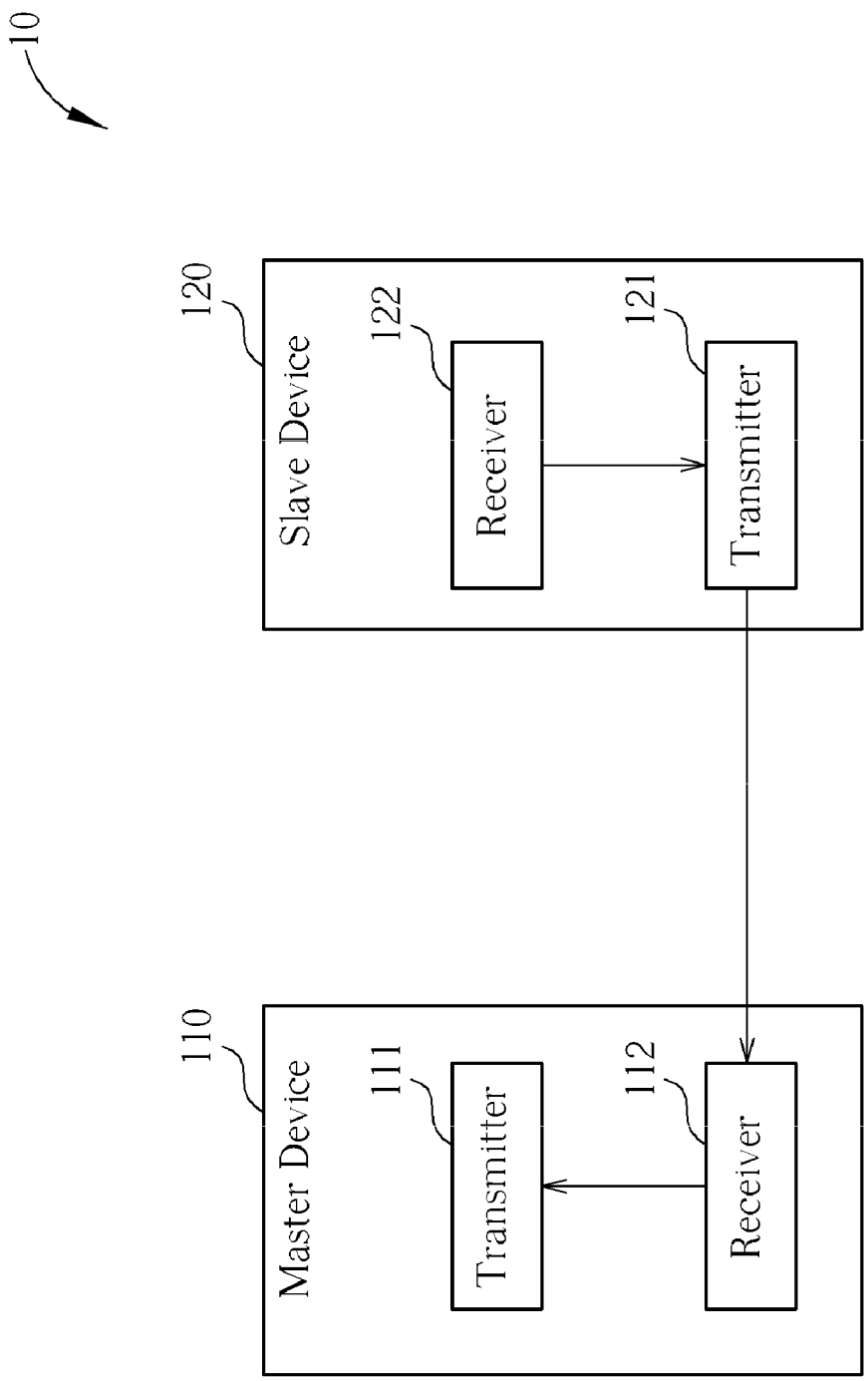
FIG. 1 is a schematic diagram of an Ethernet system.

Please refer to FIG. 1, which is a schematic diagram of an Ethernet system 10. The Ethernet system 10 is a Gigabit Ethernet system operated using an asymmetric mechanism. The Ethernet system 10 includes a master device 110 and a slave device 120. The master device 110 includes a transmitter 111 and a receiver 112. The transmitter 111 is used for transmitting data. The receiver 112 is used for receiving data sent by the slave device 120. The slave device 120 includes a transmitter 121 and a receiver 122. The transmitter 121 is used for transmitting data to the receiver 112 of the master device 110. The receiver 122 is used for receiving data. When the master device 110 and the slave device 120 perform mutual data transmission, clocks of the master device 110 and the slave device 120 must stay synchronized to obtain optimal phase performance for the receivers 112, 122 on sampling. That is, the phase of the clocks of the master device and the slave device must be identical or maintain a fixed phase difference.

When the Gigabit Ethernet system is operated using the asymmetric mechanism, the master device 110 enters a quiet mode during which the transmitter 110 is disabled and the transmitter 121 continuously sends data to the receiver 112. The present invention provides a clock synchronization method. Based on that method, when the master device 110 wakes up from the quiet mode for the first transmission, the master device knows how far the phase of the received data has drifted during this period and thereby adjusts the phase of the transmission data to correspond to the phase of the data received, avoiding data corruption caused by the data transmitted being asynchronous to the data received.

The Ethernet system 10 takes advantage of a loop-timing system. That is, the slave device 120 recovers timing according to the data received. For example, the transmitter 111 of the master device 110 transmits data using a free running clock. When the receiver 122 of the slave device 120 receives the data, the slave device 120 performs the timing recovery operation to generate a recovery clock identical to the free running clock from the master device 110. The transmitter 121 and the receiver 122 individually transmit and sample data based on the recovery clock. Once the receiver 112 receives the data sent by the slave device 120 based on the recovery clock, the receiver 112 undertakes synchronization, making the clock of the receiver 112 identical to the recovery clock.

Figure 2:
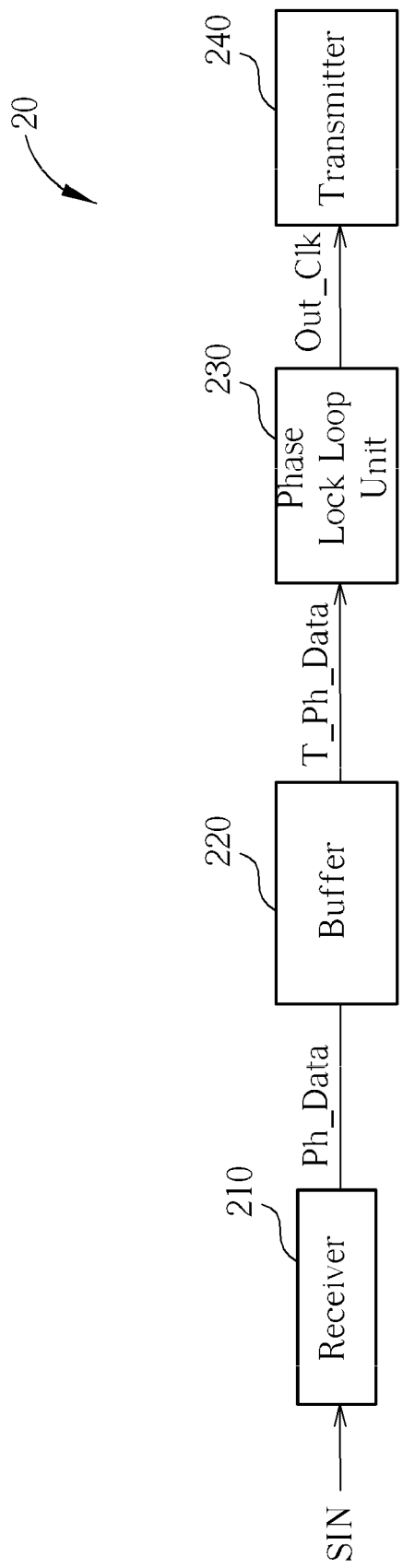
FIG. 2 is a schematic diagram of a master device for an Ethernet system according to an embodiment of the present invention.

Please refer to FIG. 2, which is a schematic diagram of a master device 20 for an Ethernet system according to an embodiment of the present invention. The master device 20 could be the master device 110 in the Ethernet system 10 and is used for improving the wake-up mechanism and solving an asynchronous problem caused by the master device 20 entering the quiet mode. The master device 20 includes a receiver 210, a buffer 220, a phase lock loop unit 230 and a transmitter 240. The receiver 210 is used for generating phase adjustment data Ph_Data according to transmission data SIN sent by a slave device when the master device operates during a switch mode. The phase adjustment data Ph_Data indicates increases or decreases of the phase of the output clock. When the master device is operated in the switch mode, the master device 20 enters a wake-up mode from a quiet mode. The transmission data SIN sent by the slave device includes phase information of a recovery clock R_Clk. Thus, the master device 20 extracts the recovery clock R_Clk from the transmission data SIN to obtain the phase information. The buffer 220 is coupled to the receiver 210 and used for accumulating the phase adjustment data Ph_Data and outputting a phase adjustment value T_Ph_Data. The phase lock loop unit 230 is coupled to the buffer 220, and used for adjusting the phase of an output clock Out_Clk according to the phase adjustment value T_Ph_Data to maintain a fixed phase difference between the recovery clock R_Clk and the output clock Out_Clk. In other words, through the phase adjustment value T_Ph_Data stored in the buffer 220, the master device 20 knows how far the phase of the recovery clock R_Clk has drifted as time passes by. Consequently, the master device 20 adjusts the phase of the transmission data to correspond to the phase of the data received, maintaining a fixed phase difference with the recovery clock R_Clk. When the master device 20 wakes up from the quiet mode, the transmitter 240 transmits initialization data to the slave device according to the output clock Out_Clk to avoid data corruption caused by the data transmitted being asynchronous to the data received. Later, the transmitter 240 of the master device 20 transmits data, reusing the free running clock.

To put it simply, when waking up for the first transmission from the quiet mode, the master device 20 adjusts the phase of the output clock Out_Clk to correspond to the phase of the data received. According to the output clock Out_Clk, the transmitter 220 transmits the data to maintain a fixed phase difference with the recovery clock R_Clk, and thus avoid data damage caused by the data transmitted being asynchronous to the data received.

Figure 3:
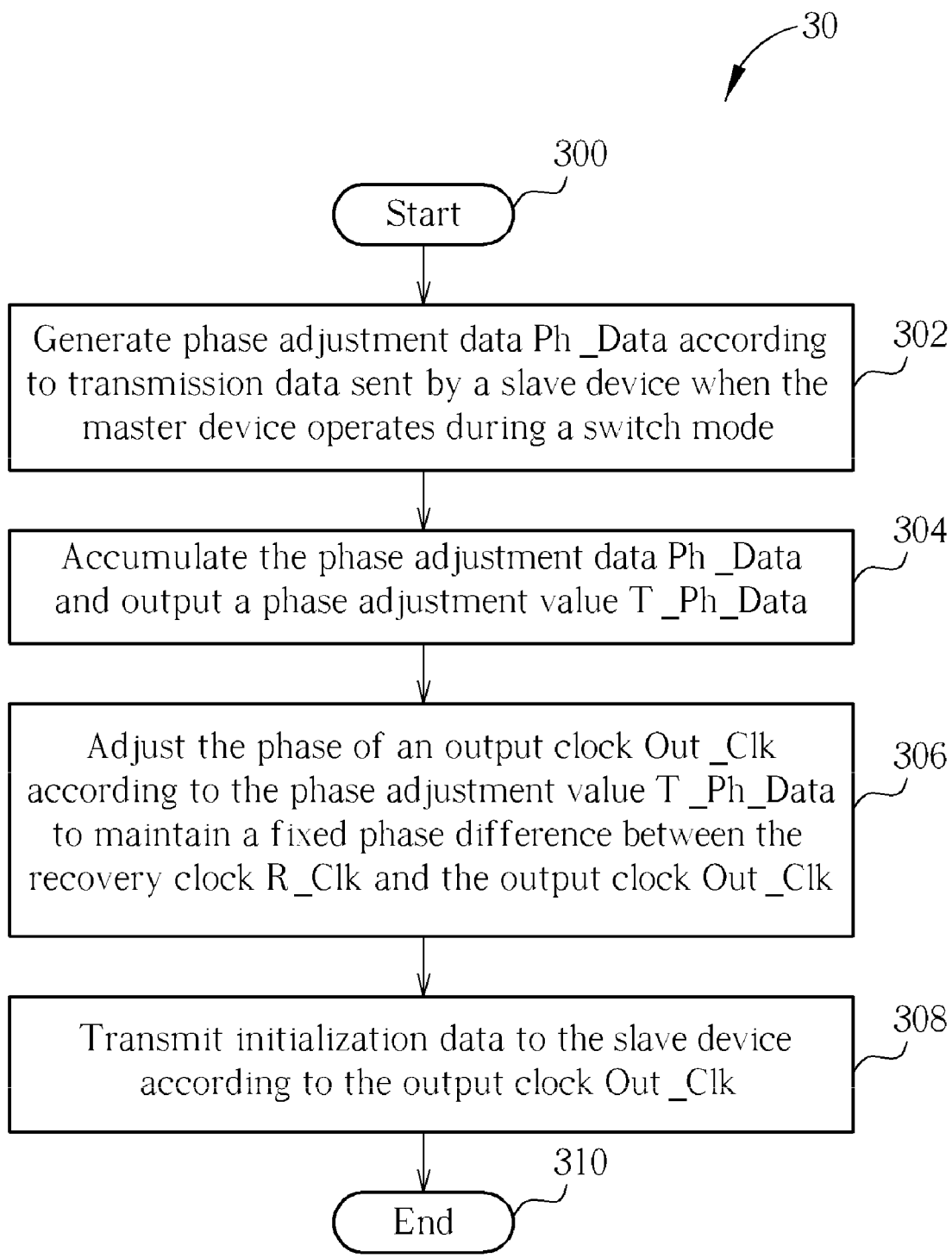
FIG. 3 is a flowchart of a clock synchronization process for a master device in an Ethernet system according to an embodiment of the present invention.

Please refer to FIG. 3, which is a flowchart of a clock synchronization process 30 for a master device in an Ethernet system according to an embodiment of the present invention. The clock synchronization process 30 includes the following steps:

Step 300: Start.

Step 302: Generate phase adjustment data Ph_Data according to transmission data sent by a slave device when the master device operates during a switch mode.

Step 304: Accumulate the phase adjustment data Ph_Data and output a phase adjustment value T_Ph_Data.

Step 306: Adjust the phase of an output clock Out_Clk according to the phase adjustment value T_Ph_Data to maintain a fixed phase difference between the recovery clock R_Clk and the output clock Out_Clk.

Step 308: Transmit initialization data to the slave device according to the output clock Out_Clk.

Step 310: End.

The clock synchronization process 30 demonstrates clock synchronization operations for the master device 20 shown in FIG. 2. Detailed description can be found above, and is not elaborated on herein. Thus, through the clock synchronization process 30, the transmitter of the master device adjusts the phase of the first transmission data to achieve synchronization after the master device wakes up from the quiet mode.

Figure 4:
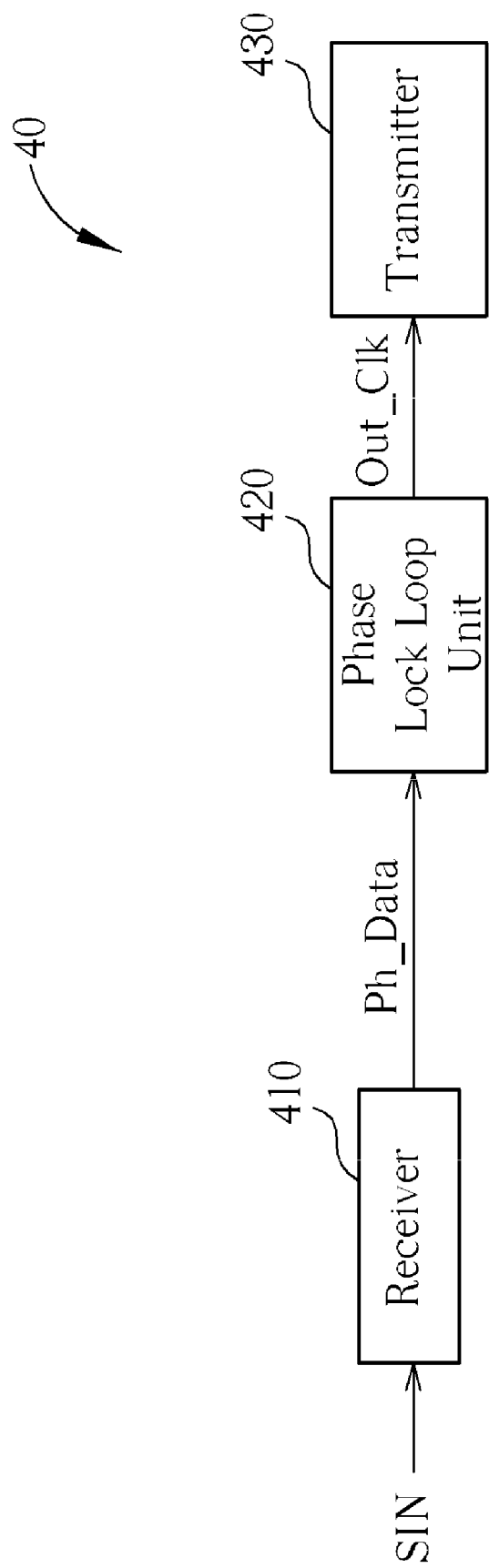
FIG. 4 is a schematic diagram of a master device for an Ethernet system according to another embodiment of the present invention.

On the other hand, the clock synchronization process 30 can be realized by those skilled in the art according to practical requirements. For example, please refer to FIG. 4, which is a schematic diagram of a master device 40 for an Ethernet system according to another embodiment of the present invention. The master device 40 could be the master device 110 in the Ethernet system 10. The structure of the master device 40 is similar to the master device 20 in FIG. 2. The only difference is that after the receiver 410 receives the phase adjustment data Ph_Data, the phase lock loop unit 420 immediately adjusts the phase of the output clock Out_Clk. The master device 40 includes a receiver 410, a phase lock loop unit 420 and a transmitter 430. The receiver 410 functions as the receiver 210 does. Thus, detailed description thereof is omitted. The phase lock loop 420 is used for immediately adjusting the phase of the transmission data according to the phase adjustment data Ph_Data to correspond to the phase of the data received. When the first data is transmitted, the phase lock loop 420 maintains a fixed phase difference to avoid data corruption caused by the data transmitted being asynchronous to the data received. After that, the transmitter of the master device transmits data according to the free running clock.

Figure 5:
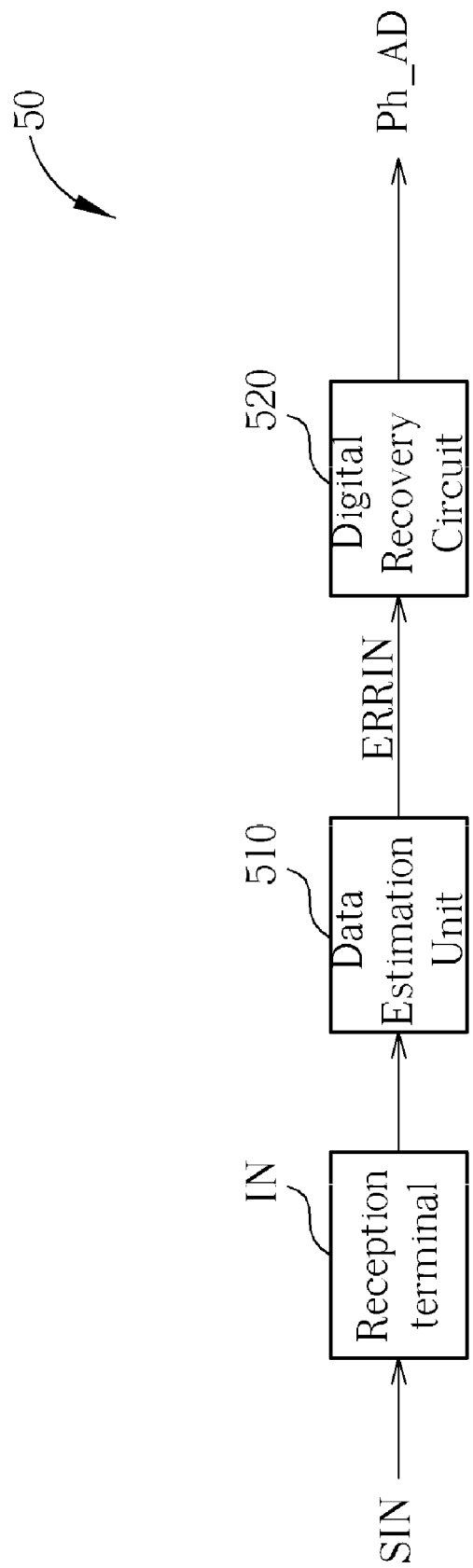
FIG. 5 is a schematic diagram of a receiver for a master device according to an embodiment of the present invention.

Please refer to FIG. 5, which a schematic diagram of a receiver 50 for a master device according to an embodiment of the present invention. The receiver 50 could be the receiver 210 of the master device 20 or the receiver 410 of the master device 40. The receiver 50 includes a reception terminal IN, a data estimation unit 510 and a digital recovery circuit 520. The reception terminal IN is used for receiving transmission data sent by a slave device, e.g. the transmission data SIN mentioned above. The data estimation unit 510 performs signal processing, such as power control and channel estimation, and is used for generating error information ERRIN according to the transmission data sent by the slave device. The digital recovery circuit 520 generates phase adjustment data Ph_AD which could be the aforementioned phase adjustment data Ph_Data. The phase adjustment data Ph_AD is used for generating an up or down signal to indicate that the phase lock loop should adjust the phase of the output clock.

Figure 6:
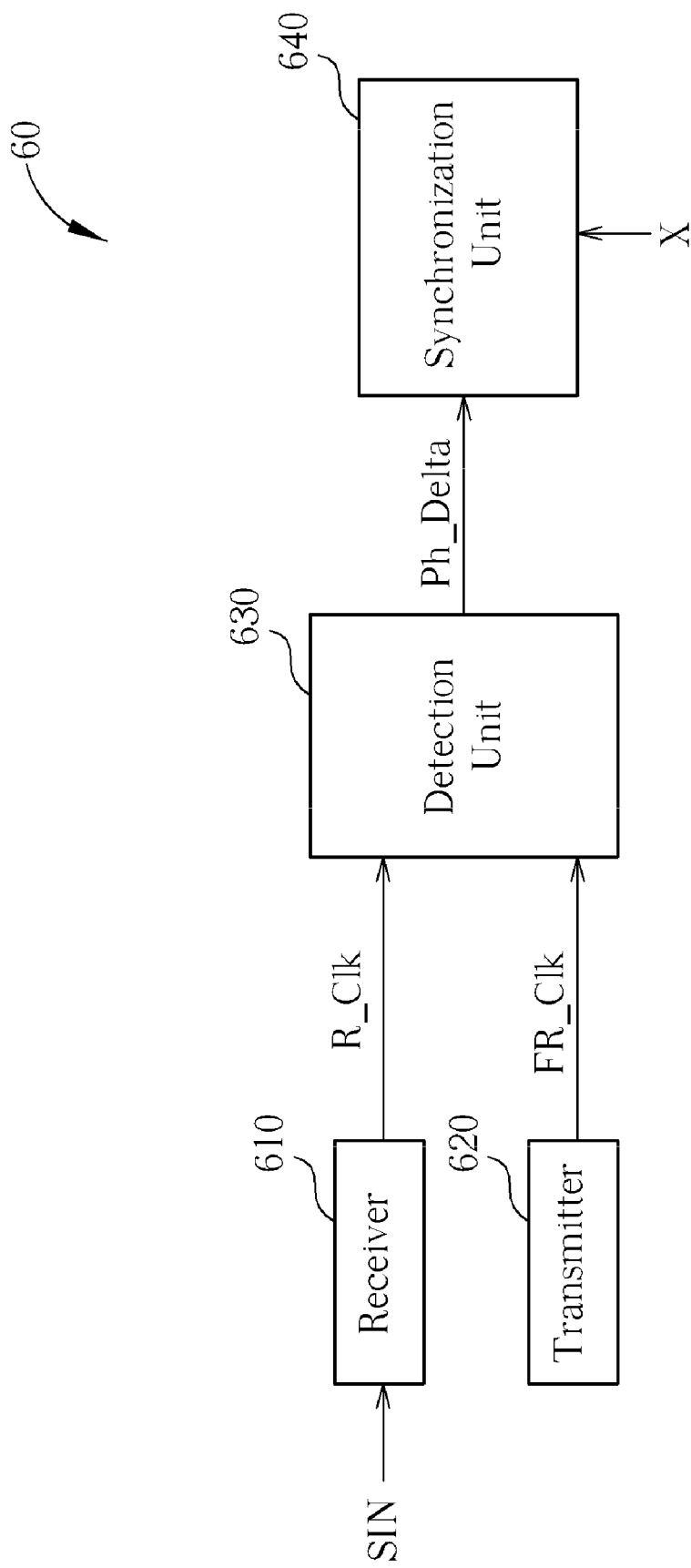
FIG. 6 is a schematic diagram of a master device for an Ethernet system according to an embodiment of the present invention.

Please refer to FIG. 6, which is a schematic diagram of a master device 60 for an Ethernet system according to an embodiment of the present invention. The master device 60 is operated in the quiet mode and used for synchronizing with the slave device. The master device dynamically adjusts wake-up timing for synchronization by the phase difference. The master device 60 includes a receiver 610, a transmitter 620, a detection unit 630 and a synchronization unit 640. The receiver 610 is used for receiving transmission data SIN from the slave device. The transmission data SIN includes phase information of a recovery clock R_Clk. The transmitter 620 operates according to a first clock FR_Clk, preferably a free running clock. The detection unit 630 is coupled to the receiver 610 and the transmitter 620 and used for detecting a phase difference between clocks of the master device and the slave device according to the first clock FR_Clk and the recovery clock R_Clk. The synchronization unit 640 is used for comparing the phase difference Ph_Delta with a tolerance value X and controlling the master device to execute a process for synchronization with the slave device when the phase difference Ph_Delta exceeds the tolerance value X. The process for performing synchronization includes the master device 60 sending an idle sequence to the slave device. The slave device performs refresh and synchronization by receiving the idle sequence.

For example, the tolerance value X is a phase difference of 5. In this situation, when the phase difference Ph_Delta exceeds the tolerance value, namely the phase difference of 5, the master device 60 wakes up from the quiet mode to send an idle sequence to the slave device. The slave device performs refresh and synchronization by receiving the idle sequence. On the contrary, when the phase difference Ph_Delta does not exceed the tolerance value, the master device 60 keeps staying in the quiet mode to save power. As a result, the master device 60 dynamically adjusts the wake-up timing, avoiding power consumption caused by waking up frequently.

Figure 7:
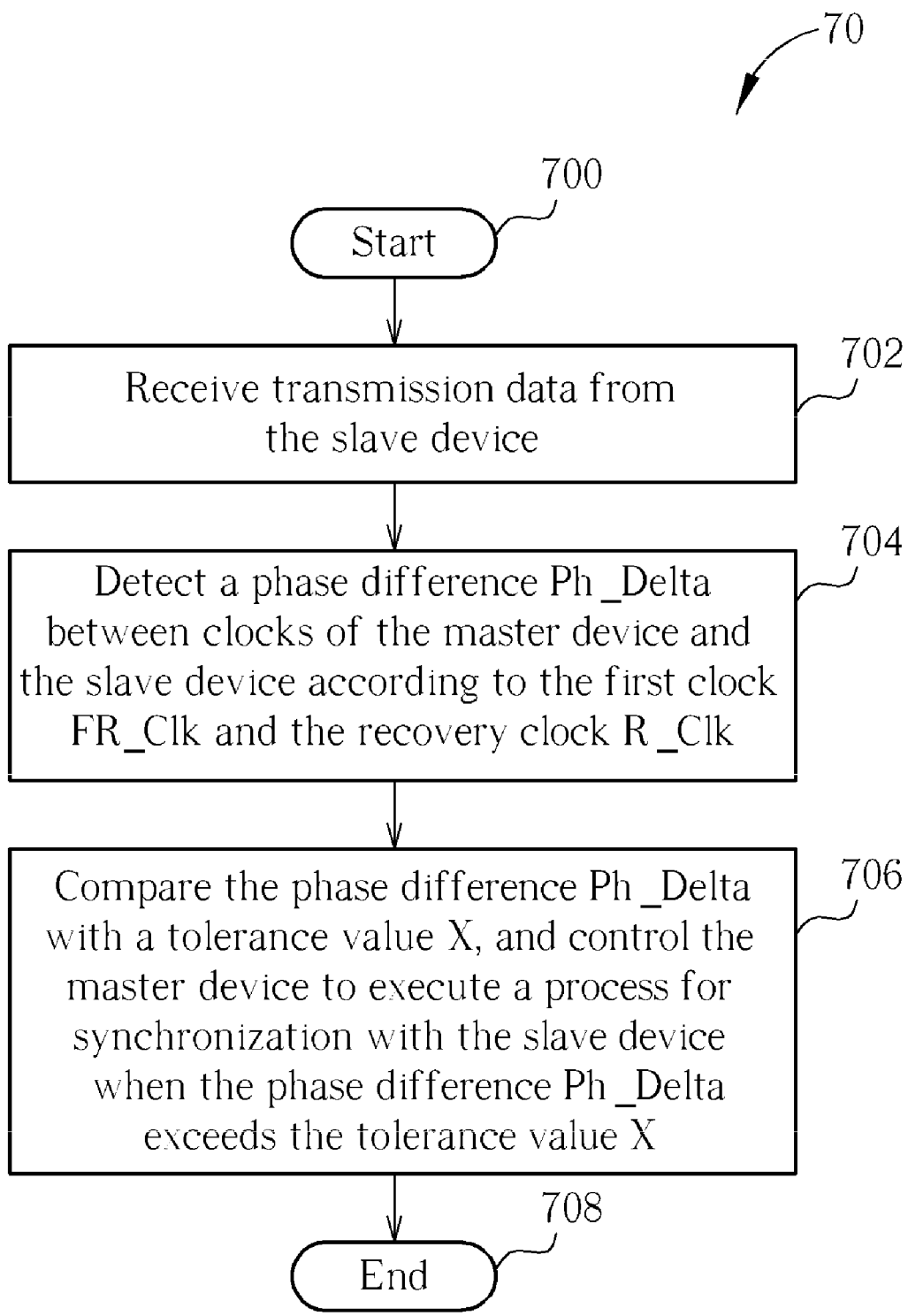
FIG. 7 is a flowchart of a clock synchronization process for a master device in an Ethernet system according to an embodiment of the present invention.

Please refer to FIG. 7, which is a flowchart of a clock synchronization process 70 for the master device 60 in an Ethernet system according to an embodiment of the present invention.

Step 700: Start.

Step 702: Receive transmission data from the slave device.

Step 704: Detect a phase difference Ph_Delta between clocks of the master device and the slave device according to the first clock FR_Clk and the recovery clock R_Clk.

Step 706: Compare the phase difference Ph_Delta with a tolerance value X, and control the master device to execute a process for synchronization with the slave device when the phase difference Ph_Delta exceeds the tolerance value X.

Step 708: End.

The clock synchronization process 70 demonstrates operations for the master device 60 shown in the FIG. 6. The detailed description can be referred found above and is not elaborated on herein. Through the clock synchronization process 70, the master device can dynamically adjust the wake-up timings for refresh and synchronization.

Figure 8:
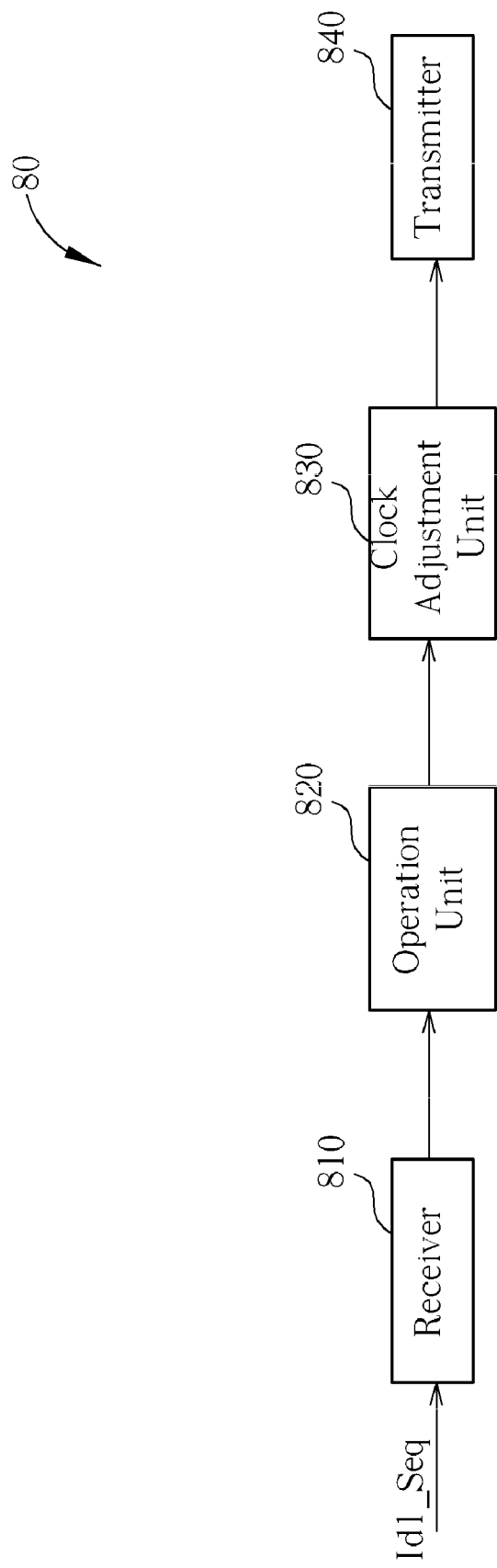
FIG. 8 is a schematic diagram of a slave device for an Ethernet system according to an embodiment of the present invention.

Please refer to FIG. 8, which a schematic diagram of a slave device 80 for an Ethernet system according to an embodiment of the present invention. The slave device 80 is used for reducing synchronization power consumption. The slave device 80 includes a receiver 810, an operation unit 820, a clock adjustment unit 830 and a transmitter 840. The receiver 810 is used for receiving an idle sequence Idl_Seq from a master device. The idle sequence Idl_Seq includes information of a free running clock from the master device. The operation unit 820 is coupled to the receiver 810 and generates a phase difference PDD according to the Idle sequence Idl_Seq. The transmitter 840 transmits data to the master device according to an output clock. The clock adjustment unit 830 is coupled to the operation unit 820 and adjusts the output clock according to the phase difference PDD. After the master device periodically wakes up from the quiet mode to send the idle sequence Idl_Seq for synchronization, the slave device 80 receives the idle sequence Idl_Seq and obtains the clock information embedded in the idle sequence Idl_Seq. The operation unit 820 calculates the phase difference between the clock of the master device and the clock embedded in the data transmitted by the transmitter 840, and further generates the phase difference PDD. When the phase difference PDD is greater than a threshold value Y, the clock adjustment unit 840 immediately adjusts the clock for transmission to correspond to the clock embedded in the idle sequence. Consequently, the master device can send idle sequence Idl_Seq less frequently, avoiding power consumption due to frequent wake-ups as well as achieving synchronization.

Figure 9:
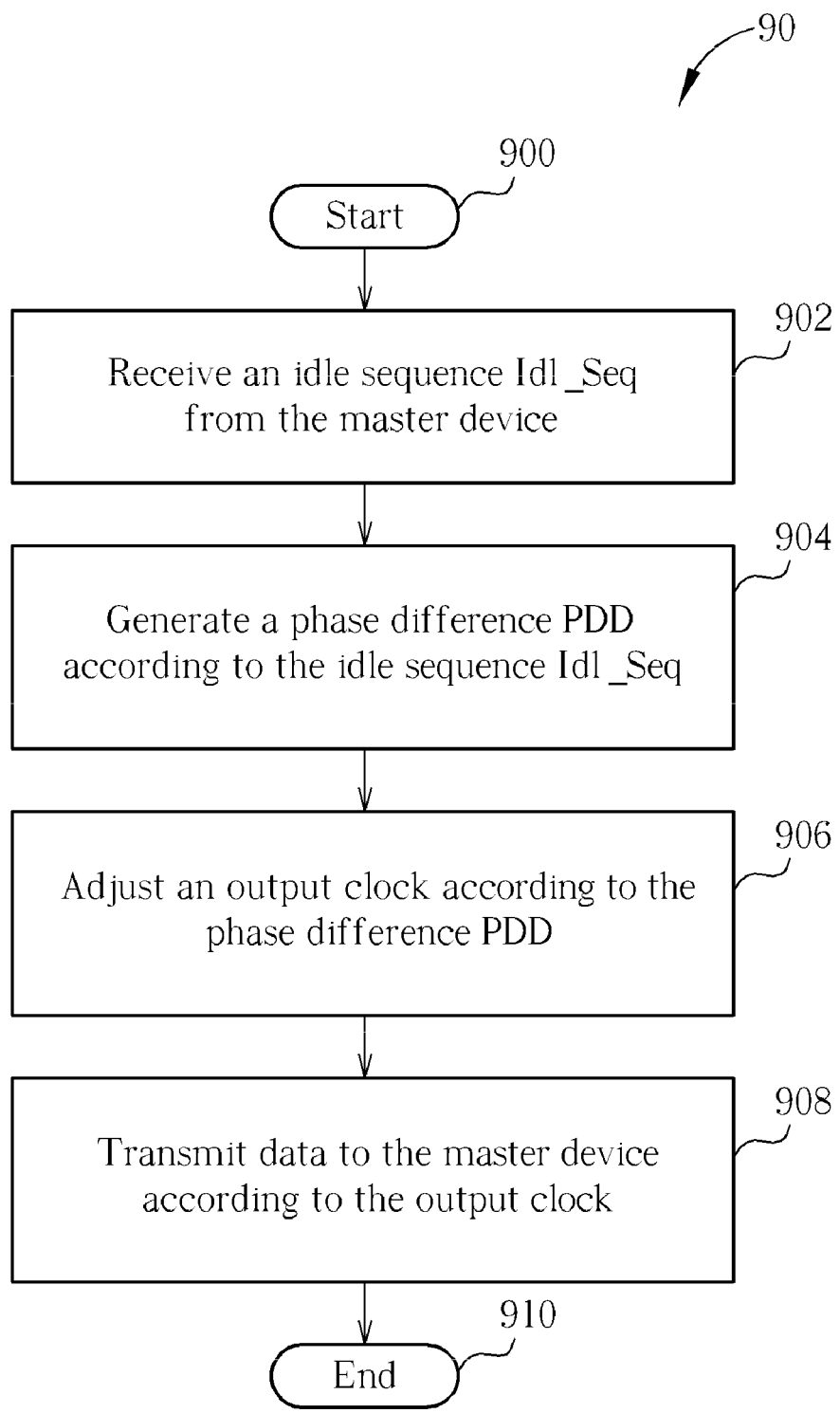
FIG. 9 is a flowchart of a process for reducing synchronization power consumption for a slave device in an Ethernet system according to an embodiment of the present invention.

Please refer to FIG. 9, which is a flowchart of a process for reducing synchronization power consumption for a slave device 80 in an Ethernet system according to an embodiment of the present invention. The process 90 includes the following steps:

Step 900: Start.
Step 902: Receive an idle sequence Idl_Seq from the master device.
Step 904: Generate a phase difference PDD according to the idle sequence Idl_Seq.
Step 906: Adjust an output clock according to the phase difference PDD.
Step 908: Transmit data to the master device according to the output clock.
Step 910: End.

The process 90 demonstrates the slave device 80 in FIG. 8. Thus, the detailed operations are referred from the above description and not elaborated on herein. By following the process 90, the master device controls the frequency of sending idle sequences for reducing synchronization power consumption.

In conclusion, an extra phase lock loop circuit is added in a master device according to an embodiment of the present invention. When the master device wakes up from the quiet mode for the first data transmission, the master device can generate a clock with a flexible phase to correspond to the data received, maintaining a fixed phase difference. Thus the synchronization problem under the asymmetric mechanism and the issue of the master device and the slave device having to wake up or enter the quiet mode together can be solved to save power. Further, by modifying the wake-up mechanism, thus reducing the frequency with which the master device sends idle sequences, the power consumption caused by frequent wake-ups can be avoided.

Those skilled in the art will readily observe that numerous modifications and alterations of the device and method may be made while retaining the teachings of the invention.

What is claimed is:

1. A master device for an Ethernet system, the master device comprising:
   a receiver for generating phase adjustment data according to transmission data sent by a slave device when the master device operates during a switch mode, the transmission data comprising phase information of a recovery clock of the slave device;
   a buffer, coupled to the receiver, for accumulating the phase adjustment data and outputting a phase adjustment value;
   a phase lock loop unit, coupled to the buffer, for adjusting the phase of an output clock according to the phase adjustment value to maintain a fixed phase difference between the recovery clock and the output clock; and
   a transmitter for transmitting initialization data to the slave device, during the switch mode, according to the phase-adjusted output clock.

2. The master device of claim 1, wherein the switch mode is entering a wake-up mode from a quiet mode.

3. The master device of claim 1, the Ethernet system is a Gigabit Ethernet system operated in an asymmetric mode.

4. The master device of claim 1, wherein the receiver comprises:
   a reception terminal for receiving the transmission data sent by the slave device;
   a data estimation unit coupled to the reception terminal for generating error information according to the transmission data sent by the slave device; and
   a digital recovery circuit for generating the phase adjustment value according to the error information.

5. A synchronization method for a master device in an Ethernet system, the synchronization method comprising:
   generating phase adjustment data according to transmission data sent by a slave device when the master device operates during a switch mode, the transmission data comprising phase information of a recovery clock of the slave device;
   accumulating the phase adjustment data and outputting a phase adjustment value;
   adjusting the phase of an output clock according to the phase adjustment value to maintain a fixed phase difference between the recovery clock and the output clock; and
   transmitting initialization data to the slave device, during the switch mode, according to the phase-adjusted output clock.

6. The synchronization method of claim 5, wherein the switch mode is entering a wake-up mode from a quiet mode.

7. The synchronization method of claim 5, wherein the Ethernet system is a Gigabit Ethernet system operated in an asymmetric mode.

8. The synchronization method of claim 5, wherein generating the phase adjustment data according to the transmission data sent by the slave device comprises:
   receiving the transmission data sent by the slave device;
   generating error information according to the transmission data sent by the slave device; and
   generating the phase adjustment value according to the error information.

9. A master device for an Ethernet system, for synchronizing with a slave device, the master device comprising:
   a receiver for receiving transmission data from a slave device, the transmission data comprising phase information of a recovery clock;
   a transmitter operating according to a first clock;
   a detection unit coupled to the receiver and the transmitter for detecting a phase difference between clocks of the master device and the slave device according to the first clock and the recovery clock; and a synchronization unit, coupled to the detection unit, for comparing the phase difference with a tolerance value and controlling the master device to wake from a quiet mode and execute a process for synchronization with the slave device when the phase difference exceeds the tolerance value, and allowing the master device to remain in a quiet mode when the phase difference does not exceed the tolerance value.

10. The master device of claim 9, wherein the master device is operated in a quiet mode.

11. The master device of claim 9, wherein the Ethernet system is a Gigabit Ethernet system operated in an asymmetric mode.

12. The master device of claim 9, wherein the process for synchronization with the slave device controls the master device to enter a wake-up mode from the quiet mode, and controls the transmitter to send an idle sequence to the slave device.

13. A method for performing synchronization between a master device and a slave device in an Ethernet system, the method comprising:
  receiving transmission data from the slave device, the transmission data comprising phase information of a recovery clock;
  detecting a phase difference between clocks of the master device and the slave device according to the first clock and the recovery clock; and
  comparing the phase difference with a tolerance value, and controlling the master device to wake up from a sleep mode and execute a process for synchronization with the slave device when the phase difference exceeds the tolerance value, and allowing the master device to remain in a quiet mode when the phase difference does not exceed the tolerance value.

14. The method of claim 13, wherein the master device is operated in a quiet mode.

15. The method of claim 13, wherein the Ethernet system is a Gigabit Ethernet system operated in an asymmetric mode.

16. The method of claim 13, wherein the process for synchronization with the slave device controls the master device to enter a wake-up mode from the quiet mode, and controls the transmitter to send an idle sequence to the slave device.

* * * * *